United States Patent
Wigley et al.

(10) Patent No.: US 7,493,525 B2
(45) Date of Patent: Feb. 17, 2009

(54) METHOD AND SYSTEM FOR MANAGING FAILURE INFORMATION

(75) Inventors: Lane Cameron Wigley, Raleigh, NC (US); Carl Schaefer, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 503 days.

(21) Appl. No.: 11/232,756

(22) Filed: Sep. 21, 2005

(65) Prior Publication Data

US 2007/0067675 A1 Mar. 22, 2007

(51) Int. Cl.
*G06F 11/00* (2006.01)
(52) U.S. Cl. .............................. 714/45; 714/37; 714/57
(58) Field of Classification Search ................... 714/18, 714/19, 26, 37, 45, 57; 702/187
See application file for complete search history.

(56) References Cited

U.S. PATENT DOCUMENTS

| | | | |
|---|---|---|---|
| 5,504,921 A * | 4/1996 | Dev et al. ................... 709/223 |
| 5,956,735 A * | 9/1999 | Clark et al. ................. 707/206 |
| 6,173,422 B1 * | 1/2001 | Kimura et al. ................ 714/57 |
| 6,725,398 B1 * | 4/2004 | Varma et al. .................. 714/25 |
| 6,738,811 B1 * | 5/2004 | Liang .......................... 709/224 |
| 6,795,935 B1 * | 9/2004 | Unkle et al. ................... 714/37 |
| 6,836,539 B2 | 12/2004 | Katou et al. |
| 6,938,089 B1 * | 8/2005 | Slaby et al. ................. 709/229 |
| 7,020,802 B2 * | 3/2006 | Gross et al. ................... 714/39 |
| 7,165,192 B1 * | 1/2007 | Cadieux et al. ............... 714/43 |
| 2002/0059075 A1 * | 5/2002 | Schick et al. .................. 705/1 |
| 2002/0178207 A1 * | 11/2002 | McNeil ...................... 709/102 |
| 2005/0138483 A1 * | 6/2005 | Hatonen et al. ............... 714/45 |
| 2006/0195297 A1 * | 8/2006 | Kubota et al. ............... 702/187 |
| 2007/0006034 A1 * | 1/2007 | Bangel et al. ................. 714/37 |

* cited by examiner

*Primary Examiner*—Joshua A Lohn
(74) *Attorney, Agent, or Firm*—Trellis IP Law Group, PC

(57) ABSTRACT

A method, system and apparatus for managing data pertaining to the failure of a network device are provided. The data is stored in a memory, and access to the stored data is provided. The memory is a non-volatile memory. Access is provided to a failure analysis team, which uses the data to analyze the causes of the failure of the network device.

20 Claims, 3 Drawing Sheets

METHOD AND SYSTEM FOR MANAGING FAILURE INFORMATION

BACKGROUND OF THE INVENTION

1. Field of Invention

Embodiments of the invention relate in general to failure management. More specifically, the embodiments of the invention relate to methods and systems for managing data pertaining to failure of network devices.

2. Description of the Background Art

Network devices are devices that are associated with the activities of a network. The network devices can develop faults that result in their malfunctioning. These faults can be due to the failure of hardware components of the network device or the failure of the software used in the network device. For example, a network device such as a router may malfunction due to a memory parity error caused by an extended operation at an out of range temperature. A user of the network device may report the failure to the manufacturer of the network device. For example, a user of the network device such as a modem would lodge a compliant with the manufacturer of the modem if it malfunctions.

Generally, the complaint is made to a customer support center of the manufacturer. For example, the user can call the customer support center and lodge a complaint about the malfunction or failure of the network device. The manufacturer may replace the network device or may repair the failure of the network device. Further, a failure analysis team investigates the complaint and attempts to diagnose the cause of the failure. However, in order to effectively perform failure analysis, the failure analysis team requires information pertaining to the failure. This information is required for a comprehensive analysis of the causes of the failure. This information can be data about the failure, the state of the device at the time of the failure, or the state of the device preceding the failure. For example, the failure analysis team may receive an error message that indicates type of failure of the network device. The failure analysis team can use this data to diagnose the cause of failure. Moreover, the failure analysis team can use this information to more effectively recognize trends in the causes of failure of the network devices. Further, there is a direct connection between the amount and accuracy of the information available and the effectiveness of the analysis of the failure of the network device.

According to a conventional technique, information pertaining to the failure of the network device is reported by the user to the customer support center. Thereafter, the information is provided to the failure analysis team by the customer support center. The information can be provided by phone or sending an e-mail. However, the user making the complaint to the customer support center may be unwilling to provide all the information. Further, the user may not be able to provide all the relevant information about the failure of the network device due to lack of knowledge, lack of time, or user's inability to capture the information from the network device.

In another conventional technique, information pertaining to the failure of the network device is provided to the failure analysis team by the manufacturer's support staff. The support staff collects the information from the users manually and provides it to the failure analysis team. However, this technique may be costly for the manufacturer, as it requires a dedicated support staff.

DETAILED DESCRIPTION OF EMBODIMENTS OF THE INVENTION

Embodiments of the invention provide methods, systems, and computer-readable media for managing data pertaining to the failure of a network device. The failure of the network device can be due to the failure of a hardware component of the network device or of its software. The data is stored in a non-volatile memory of the network device and indicates the failure and environmental state of the network device. Various embodiments of the invention provide a method and system for storing the data, and provide access to the stored data to a failure analysis team. The failure analysis team analyses the causes of the failure, based on data from conventional techniques and the data stored in the non-volatile memory of the network device. Therefore, the data helps the failure analysis team in performing a comprehensive diagnosis of the causes of the failure. Similarly, the data collected for a group of network devices helps in identifying trends in the causes of failures among the group of network devices.

Figure 1:
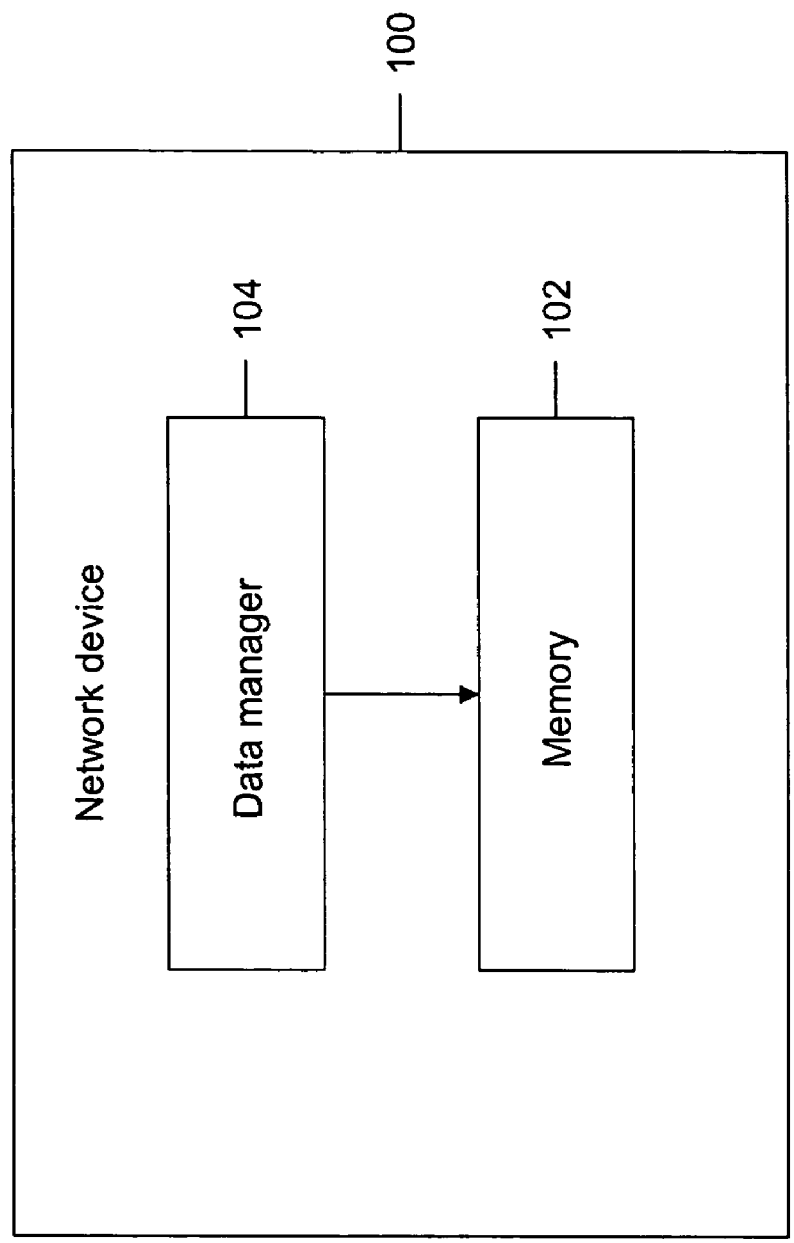
FIG. 1 illustrates a network device, in accordance with various embodiments of the invention.

FIG. 1 illustrates network device 100, in accordance with various embodiments of the invention. Network device 100 is a device that is a part of a network such as an Internet, a Local Area Network (LAN), a Wide Area Network (WAN), a Metropolitan Area Network (MAN), and the like. Network device 100 is associated with the activities of the network. For example, a network device may forward messages in the network and participate in decisions needed for running of the network. Examples of network device 100 include, but are not limited to, a router, a field replaceable component of a router, a layer 1 hub, a layer 2 switch, and a modem. For example, network device 100 can be 12000 series router by Cisco, which includes Route Processors (RP), Line Cards (LC), fabric cards, power supplies, and fan modules. According to various embodiments of the invention, network device 100 includes a memory 102 and a data manager 104.

According to various embodiments of the invention, memory 102 is a non-volatile memory of network device 100 that stores data pertaining to the failure of network device 100. According to various embodiments of the invention, memory 102 stores data about the failure of the hardware of network device 100. For example, memory 102 stores data about the environment before and at the time of the failure of network device 100. The non-volatile memory retains the data, even if network device 100 restarts or becomes non-operational due to, for example, a power failure. For example, memory 102 retains data pertaining to failure, while network device 100 is disconnected from the network and provided to the manufacturer of network device 100. Moreover, the data can be retrieved, even in the event of the failure of network device 100. For example, the data stored in 12000 series RP and LC can be retrieved in the event of a crash of the LC or failure of the LC. In an alternative embodiment of the invention, memory 102 is a volatile memory having an external power supply and storing the data pertaining to failure of network device 100. Further, in case of a failure of power to network device 100, memory 102 retains the data because of the external power supply. For example, memory 102 may be a Static Random Access Memory (SRAM) having separate power supply from a battery. In one embodiment of the invention, memory 102 is attached to network device 100. For example, memory 102 is a flash memory that is attached to network device 100. In an alternative embodiment, memory 102 is a flash memory that is embedded in network device 100. For example, memory 102 is a 128 Kilo Byte (KB) Electrically Erasable Programmable Read-Only Memory (EEPROM) of 12000 series RP and LC. In another embodiment of the invention, memory 102 is a storage device of a power supply of network device 100 or storage device of switch fabric cards of network device 100.

Further, in an embodiment of the invention, the data stored in memory 102 can be erased and reprogrammed without removing memory 102 from network device 100. For example, data stored in a flash memory of a Maintenance Bus (MBUS) agent of 12000 series RP and LC can be re-written by the MBUS agent. The MBUS agent is a low level system controller that coordinates an initial startup and low level communications of 12000 series RP and LC. Further, the flash memory has a finite number of erase cycles. The erase cycles refer to the number of times the data stored in the flash memory can be re-written. Generally, the flash memory is rated for at least one million erase cycles. Moreover, in a typical steady state, data is written in the flash memory at a rate of about hundred bytes of the data in 10 minutes. In addition, the flash memory can have different combinations of device and sector sizes. For example, 128 Kilo Bytes (KB) flash memory can have 8 sectors of 16 KB or 32 sectors of 4 KB.

According to various embodiments of the invention, data manager 104 facilitates storage of data in memory 102. According to various embodiments of the invention, data manager 104 is an infrastructure-level or application-level software, which can be embedded in network device 100 and is capable of storing the data in memory 102. In an embodiment of the invention, data manager 104 compresses the data and stores the compressed data in memory 102. The data is compressed to conserve the memory space of memory 102. For example, data manager 104 compresses blocks of ASCII data pertaining to the failure of network device 100. Further, data manager 104 provides access to the stored data. In an embodiment of the invention, data manager 104 provides access to the data to a failure analysis team, which uses the data to analyze the causes of the failure of network device 100. According to various embodiments of the invention, data manager 104 provides a programmatic interface that allows the failure analysis team to access the data and diagnose the causes of the failure. For example, the data in memory 102 is accessible to the failure analysis team through Command Line Interface (CLI).

According to various embodiments of the invention, data manager 104 consolidates the data stored in memory 102. The consolidation of data includes copying, erasing, replacing and modifing the data. For example, consolidation of data that is stored in a flash memory involves erasing of sectors of the flash memory and storing of recent data. Further, the data consolidation takes place, based on free space available in memory 102. The data is consolidated when the available free space in memory 102 goes below a free-space threshold of memory 102. The free-space threshold may be a pre-defined threshold that may be defined by the manufacturer of network device 100.

In an embodiment of the invention, memory 102 is divided into an active region and a buffer region based on the free-space threshold of memory 102. The active region is utilized, first, to store the data. Once the active region is filled up, then the data is screened for data to be saved. Thereafter, the data to be saved is copied to the buffer region and obsolete data is left in the active region. The buffer region is a region of memory 102 that is utilized once the active region is filled with data. Thereafter, the obsolete data in the active region is replaced with new data, which corresponds to the time of the failure that is later than the time of the failure of the obsolete data. Accordingly, whenever the active region is filled up, the process is repeated. According to various embodiments of the invention, data manager 104 consolidates the data in memory 102, to conserve the memory space of memory 102. Moreover, the consolidation of the data can provide the failure analysis team with more failure history than obtained if the data was to be directly replaced. In addition, in an embodiment of the invention, data manager 104 can group the data stored in memory 102. In an embodiment of the invention, the data can be grouped, based on the type of failure. For example, data manager 104 can group data related to Buffer Management ASIC (BMA) errors into a BMA-specific group. In an embodiment of the invention, the data can be grouped, based on the time of the failure.

Figure 2:
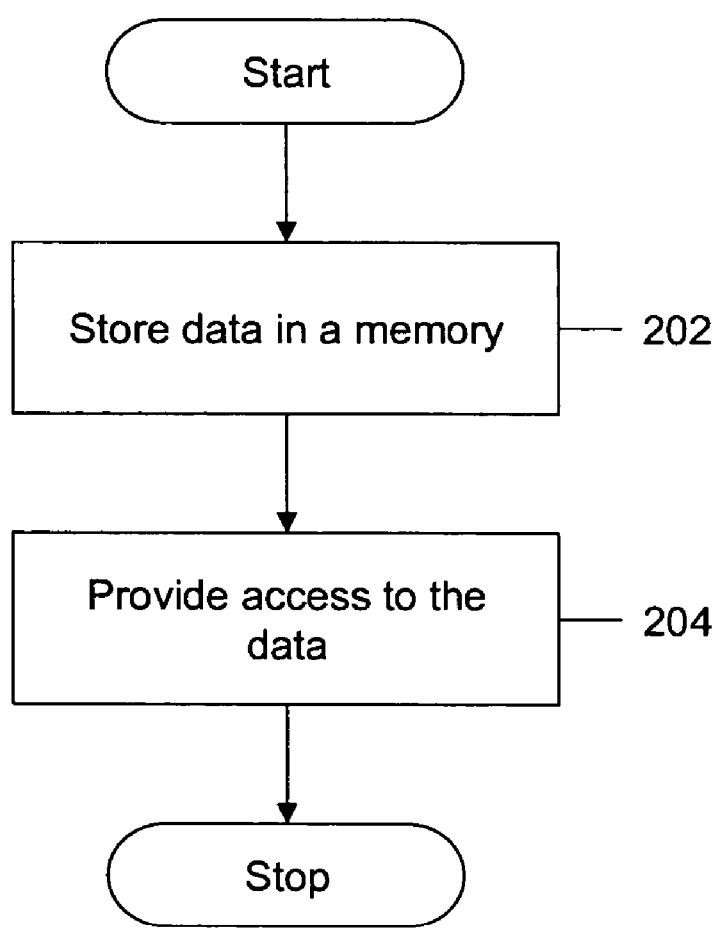
FIG. 2 is a flowchart illustrating the method for managing data pertaining to the failure of the network device, in accordance with various embodiments of the invention.

FIG. 2 is a flowchart illustrating the method for managing data pertaining to the failure of network device 100, in accordance with various embodiments of the invention. At step 202, data pertaining to the failure of network device 100 is stored in memory 102. According to various embodiments of the invention, data manager 104 facilitates storage of the data in memory 102. In one embodiment of the invention, data manager 104 facilitates storage of the data in a LC, a RP, a fabric card, a fan module and a power supply of network device 100. In accordance with an embodiment of the invention, the data is stored locally in an internal non-volatile memory of the LC, the RP, the fabric card, the fan module or the power supply. Further, the data can be retrieved in case network device 100 resets or crashes.

At step 204, data manager 104 provides access to the data stored in memory 102. According to various embodiments of the invention, data manager 104 provides the access to the failure analysis team. For example, data manager 104 provides a programmatic interface, such as CLI, through which data related to specific RP or LC, can be viewed. According to various embodiments of the invention, the data stored in memory 102 can be a boot log record, a runtime log record, failure event data or environmental data.

The boot log record includes the boot time for each boot event of network device 100. For example, the boot log record can include a list of boot log records of 12000 series RP and LC. Moreover, the boot log record can include the air temperatures at an inlet of RP and LC and at their hottest point. The data can also include data related to the memory configuration of a variable-sized memory. For example, data pertains to the amount of memory space available in memory 102 for storing the network information. In one embodiment of the invention, the data includes the time of the failure of network device 100. For example, the data includes the calendar time of the failure of network device 100.

The run-time log record indicates the cumulative runtime of network device 100 since it left the manufacturer. For example, the runtime log record of a 12000 series RP and LC indicates its total runtime since its initial installation, based on a RP clock. According to various embodiments of the invention, the run-time log record can be used to determine that the failure occurred upon initial operation of network device 100 or after network device 100 became operational. Further, the failure event data stored in memory 102 can include LC crashes, memory errors, hardware ASIC resets, Field Programmable Gate Array (FPGA) resets or other hardware failure indications. The environmental data pertains to environmental information about network device 100. For example, the environmental information indicates temperature levels of RP and LC, and voltage levels of RP and LC.

According to various embodiments of the invention, data manager 104 provides access to the boot log record, the run-time log record, the failure event data, and the environmental data stored in memory 102. For example, a 'show logging onboard' command is used to display the data stored in memory 102 for a specific RP or LC. An example of the data displayed for network device 100 such as a router is illustrated below:

```
router# show logging onboard
Log cleared at Jan 14 2004 16:51:56
Runtime cleared at Jan 14 2004 16:52:31
Boot location #0: slot 7 in 'router'
Temperature after last boot in location #0: inlet 31 C., hot point 39 C.
Inlet temperature range 55 -68 from Jan 19 2004 18:40:19 to Jan 19 2004 19:33:16
5V range 5250 -5510 from Jan 20 2004 02:06:47 to Jan 20 2004 02:26:10
<=== Crash at Jan 20 2004 11:05:36 ===>
GS Software (GSR-P-M), Version 12.0(20031217:031315)S
Compiled Wed 24-Dec-03 19:06 by apratend
Card uptime was 7 days, 3 hours, 21 minutes
System exception: sig=5, code=0x24, context=0x422C2914
System restarted by a Bus Error exception
STACK TRACE:
-Traceback= 50DC091C 5005D028 5006E7A4 500C9898 500C9884
CONTEXT:
$0 : 00000000, AT : 51A30000, v0 : FFFFFFFF, v1 : 00000000
a0 : 00000030, a1 : 52F17F00, a2 : 51A2C900, a3 : BEEFCAFE
t0 : 00008100, t1 : 34008101, t2 : 500FAA88, t3 : FFFF00FF
t4 : 500FAA58, t5 : 00000064, t6 : 00000000, t7 : 00000000
s0 : 00000038, s1 : 00000054, s2 : 00000015, s3 : 51910000
s4 : 53AA5D68, s5 : 00000000, s6 : 00000001, s7 : 00000000
t8 : 5440B538, t9 : 00000000, k0 : 53173160, k1 : 500FD424
gp : 51A343A0, sp : 53AA5D50, s8 : 51910000, ra : 50DC0908
EPC : 0x50DC0918, SREG : 0x34008103, Cause : 0x80000024
ErrorEPC : 0x506F0044, BadVaddr: 0xC9070369
Current/last process: pid 64, name "Exec"
-Process Traceback= No Extra Traceback
<=== End Crash ===>
Temperature after last boot in location #0: inlet 31 C., hotpoint 40 C.
Inlet temperature sensor value 72 at Jan 26 2004 11:20:49
Inlet temperature sensor value 63 at Jan 26 2004 11:27:15
Inlet temperature sensor okay at Jan 26 2004 11:33:46
Boot location #1: slot 6 in 'router'
Temperature after last boot in location #1: inlet 31 C., hotpoint 40 C. T
Logging disabled at Jan 27 2004 16:00:02.
```

In the above example, 'Log cleared at Jan 14 2004 16:51:56' indicates the calendar time when the data stored in memory 102 was last cleared. 'Runtime cleared at Jan 14 2004 16:52:31' indicates the calendar time of the last clearance of the total operational runtime of the router. 'Boot location #0: slot 7 in 'router'' indicates a first boot log record of the LC installed in slot 7 of the router. The first boot log record indicates the boot log record at the initial boot of the LC. Further, boot log records can be numbered, for example, zero to nine. The boot log record numbered zero indicates the first boot log record. Further, new boot log records that are created after the boot log record numbered nine are recorded by replacing the earlier boot log records. For example, a new boot log record after the boot log record numbered nine replaces the earlier boot log record numbered one. Similarly, the other earlier boot log records are replaced by new boot log records that have the same number as the earlier boot log records, such that the boot log record numbered zero is stored permanently. However, the boot log record numbered zero can be cleared manually. 'Temperature after last boot in location #0: inlet 31 C., hot point 39 C.' indicates the temperatures at inlet and hottest point of the router recorded by an environmental sensor, after the initial boot of the router. 'Inlet temperature range 55 - 68 from Jan 19 2004 18:40:19 to Jan 19 2004 19:33:16' indicates the range of temperatures, which were recorded by the environmental sensor of the router. The calendar time indicates the time between which the temperatures were recorded. '5V range 5250 -5510 from Jan 20 2004 02:06:47 to Jan 20 2004 02:26:10' indicates that the power supply was above the expected range. The calendar time indicates the time for which the power supply was above the expected range. '<=== Crash at Jan 20 2004 11:05:36 ===>' indicates the calendar time when the router suffered a crash. 'GS Software (GSR-P-M), Version 12.0(20031217:031315)S' indicates the version of the release of the router software. In the example illustrated above, the version indicated is a version of Cisco IOS 12.0S. 'Compiled Wed 24-Dec-03 19:06 by apratend' indicates the -continued compilation date of the router software. 'Card uptime was 7 days, 3 hours, 21 minutes'
indicates the total runtime since the last restart of the LC. This indicates that the LC had
been running for seven days, three hours, and 21 minutes without a restart. 'System
exception: sig=5, code=0x24, context=0x422C2914' and 'System restarted by a Bus
Error exception' indicates that the router was last reset by a type of failure known as a
bus error. 'STACK TRACE:
-Traceback= 50DC091C 5005D028 5006E7A4 500C9898 500C9884
CONTEXT:
$0 : 00000000, AT : 51A30000, v0 : FFFFFFFF, v1 : 00000000
a0 : 00000030, a1 : 52F17F00, a2 : 51A2C900, a3 : BEEFCAFE
t0 : 00008100, t1 : 34008101, t2 : 500FAA88, t3 : FFFF00FF
t4 : 500FAA58, t5 : 00000064, t6 : 00000000, t7 : 00000000
s0 : 00000038, s1 : 00000054, s2 : 00000015, s3 : 51910000
s4 : 53AA5D68, s5 : 00000000, s6 : 00000001, s7 : 00000000
t8 : 5440B538, t9 : 00000000, k0 : 53173160, k1 : 500FD424
gp : 51A343A0, sp : 53AA5D50, s8 : 51910000, ra : 50DC0908
EPC : 0x50DC0918, SREG : 0x34008103, Cause : 0x80000024
ErrorEPC: 0x506F0044, BadVaddr : 0xC9070369
Current/last process: pid 64, name "Exec"
-Process Traceback= No Extra Traceback
<=== End Crash ===> ' indicates specific software or hardware routines that were
active at the time of the failure of the router. For example, 'STACK TRACE:
-Traceback= 50DC091C 5005D028 5006E7A4 500C9898 500C9884' indicates the
function call chain that was active at the time of crash of the router. 'CONTEXT:
$0 : 00000000, AT : 51A30000, v0 : FFFFFFFF, v1 : 00000000
a0 : 00000030, a1 : 52F17F00, a2 : 51A2C900, a3 : BEEFCAFE
t0 : 00008100, t1 : 34008101, t2 : 500FAA88, t3 : FFFF00FF
t4 : 500FAA58, t5 : 00000064, t6 : 00000000, t7 : 00000000
s0 : 00000038, s1 : 00000054, s2 : 00000015, s3 : 51910000
s4 : 53AA5D68, s5 : 00000000, s6 : 00000001, s7 : 00000000
t8 : 5440B538, t9 : 00000000, k0 : 53173160, k1 : 500FD424
gp : 51A343A0, sp : 53AA5D50, s8 : 51910000, ra : 50DC0908
EPC : 0x50DC0918, SREG : 0x34008103, Cause : 0x80000024
ErrorEPC : 0x506F0044, BadVaddr : 0xC9070369' indicates the CPU register values at
the time of crash of the router. 'Current/last process: pid 64, name "Exec"' indicates the
IOS process that was running at the time of the crash of the router. 'Logging disabled at
Jan 27 2004 16:00:02' indicates the calendar time when the process of storing the data
was disabled.

Further, according to various embodiments of the invention, data manager 104 can provide access to specific data if requested. For example, 'router 1 # show logging onboard slot 1 type boot' indicates the boot log record pertaining to failure of a component in slot 1 of the router. Further, the component can be the RP, the LC, the fabric card, the fan module, or the power supply. An example of boot log record is illustrated below:

| Router | Slot | Date and Time | Inlet | Mem(main/pkt) |
| --- | --- | --- | --- | --- |
| Router1 | 1 | May 08, 2005 23:12:32 PST | 36 | 512/512 |

In the example of the boot log record given above, 'slot' indicates the initial boot location of the component was slot 1 in the router 1. Moreover, 'date and time' indicate the calendar date and the time of the booting of the component in slot 1. The 'inlet' indicates the temperature at the inlet of the component after the boot of the router 1. 'Mem' indicates the size of a main memory and a packet memory present in the component, when the boot cycle shown in the illustrated boot log record occurred.

Similarly, the run-time log record of network device 100 can be displayed. For example, 'router>show logging onboard runtime' displays the run-time log record of router 1.

Figure 3:
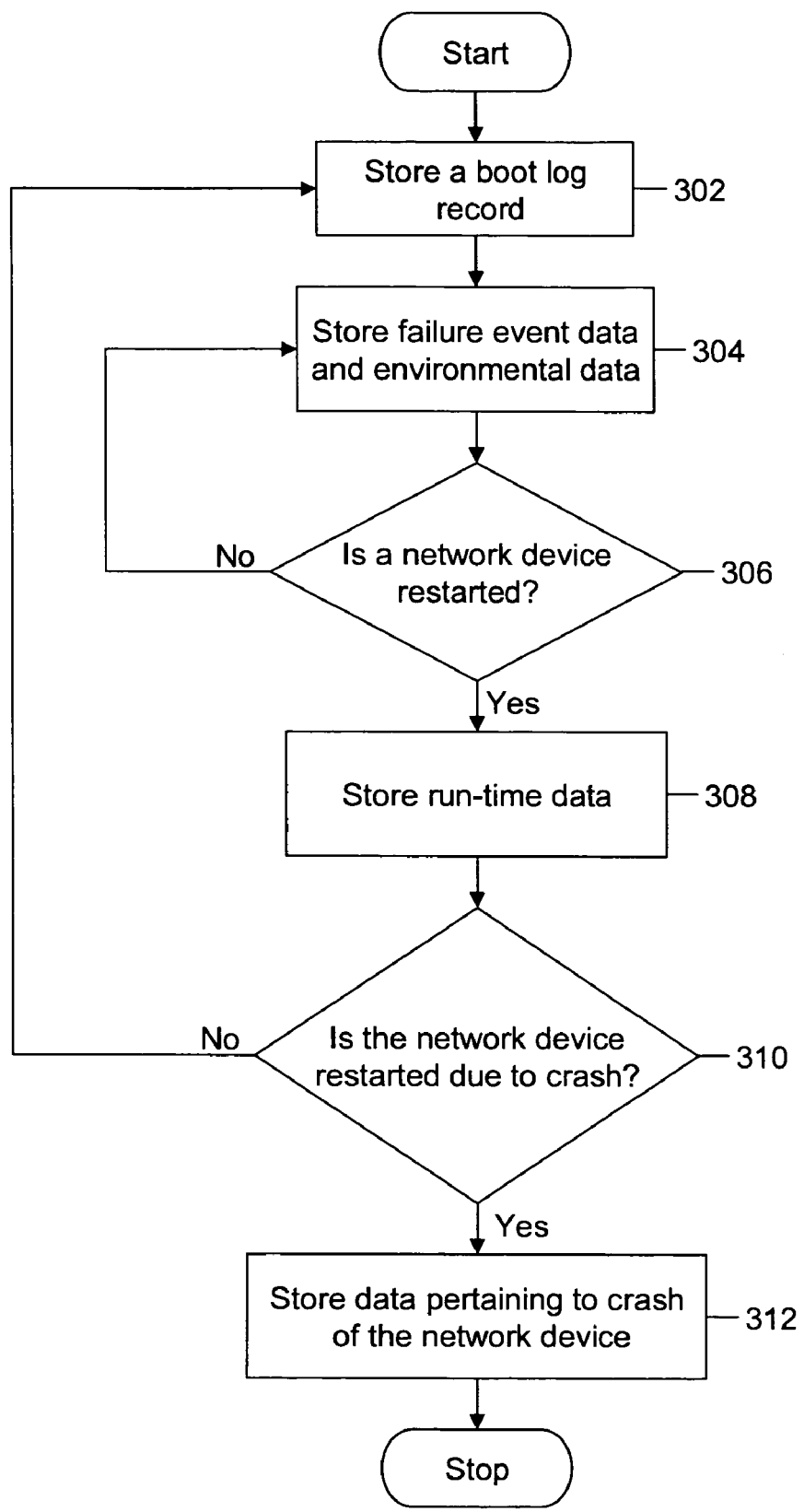
FIG. 3 is a flowchart illustrating the method for managing data pertaining to the failure of the network device, in accordance with an embodiment of the invention.

FIG. 3 is a flowchart illustrating the method for managing data pertaining to the failure of network device 100, in accordance with an embodiment of the invention. At step 302, data manager 104 stores the boot log record in memory 102. The details pertaining to the boot log record have been explained in reference to FIG. 2. According to various embodiments of the invention, data manager 104 provides access to the boot log record to the failure analysis team. At step 304, data manager 104 stores the failure event data and the environmental data in memory 102. The details pertaining to the failure event data and the environmental data have been explained in reference to FIG. 2. According to various embodiments of the invention, data manager 104 monitors information pertaining to failure of network device 100 and the environmental measurements for network device 100. Thereafter, data manager 104 stores the failure event data and out of range measurements in the environmental data in memory 102. At step 306, it is checked if network device 100 has been restarted. At step 308, data manager 104 stores the run-time log record if network device 100 has been restarted. The details pertaining to the run-time log record have been explained in reference to FIG. 2. According to various embodiments of the invention, data manager 104 provides access to the failure event data, the environmental data, and the run-time log record. At step 310, it is checked if network device 100 has been restarted due to the crash of network device 100. Thereafter, at step 312, data manager 104 stores the data pertaining to the crash of network device 100.

If at step 306, it was found that network device 100 has not been restarted then steps 304 and 306 are repeated. Moreover, at step 310, if it was found that network device 100 has not been restarted because of the crash of network device 100, then steps from step 302 can be repeated.

Embodiments of the invention facilitate the capture and storage of information pertaining to the failure of network device 100 in its non-volatile memory. The information is preserved even in the event of a crash of network device 100, failure of network device 100, or failure of power to network device 100. Moreover, the information can be accessed even if network device 100 fails to boot. For example, the information can be accessed from the non-volatile memory using a special device that can access the stored information on the non-volatile memory. For example, in 12000 series router by Cisco, which includes RP's and LC's, the information in form of data is stored in a MBUS flash memory. The MBUS flash memory can be a memory of the LC. Thereafter, if the LC fails to boot, the data stored on the MBUS flash memory can be accessed by another LC of the router. In addition, the data can also be accessed by a LC of a separate router that is operated by a failure analysis team. Further, the information can be viewed by the failure analysis team using the CLI. This helps in diagnosing catastrophic failures which prevent the functioning of network device 100. The information helps the failure analysis team to improve troubleshooting accuracy in the event of failures of network device 100. The information aids the failure analysis team in determining the root cause of the failure. Further, based on this information, the failure analysis team can perform a comprehensive diagnosis of the causes of the failure of network device 100.

Although the invention has been discussed with respect to specific embodiments thereof, these embodiments are merely illustrative, and not restrictive, of the invention.

Although specific protocols have been used to describe embodiments, other embodiments can use other transmission protocols or standards. Use of the terms 'peer', 'client', and 'server' can include any type of device, operation, or other process. The invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the invention, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the invention.

Also in the description herein for embodiments of the invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the invention.

A 'computer readable medium' for purposes of embodiments of the invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the invention may be combined in any suitable manner with one or more other embodiments. It is to be understood that other variations and modifications of the embodiments of the invention described and illustrated herein are possible in light of the teachings herein and are to be considered as part of the spirit and scope of the invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for managing data pertaining to a failure of a network device, the method comprising:
    collecting the data for storage in a non-volatile memory of the network device, the data being collected in a boot log record, a runtime log record, a failure event data portion, and an environmental data portion;
    storing the boot log record, wherein the boot log record pertains to a boot history of the network device;
    storing the failure event data and the environmental data portions, wherein the failure event data portion indicates a hardware failure of the network device, and wherein the environmental data portion includes environmental information pertaining to the network device;
    storing the runtime log record when the network device is restarted, wherein the runtime log record pertains to an operational history of the network device; and
    providing access to the data stored in the non-volatile memory.

2. The method of claim 1, further comprising compressing the data for the storage in the non-volatile memory.

3. The method of claim 1,
    further comprising storing data pertaining to a crash of the network device when the network device is restarted due to the crash.

4. The method of claim 1, wherein the failure event data portion further comprises data pertaining to a connectivity failure of hardware of the network device.

5. The method of claim 1, wherein the failure event data portion further includes a time of the failure of the network device.

6. The method of claim 1, further comprising consolidating the data based on free space available in the non-volatile memory.

7. The method of claim 6, wherein the consolidating the data comprises deleting obsolete data stored in the non-volatile memory.

8. The method of claim 6, wherein the consolidating the data comprises replacing the data stored in the non-volatile memory with new data having a time of failure later than the time of failure of the data stored in the non-volatile memory.

9. The method of claim 6, wherein the consolidating the data comprises grouping the data based on a type of the failure.

10. The method of claim 1, wherein the providing access to the data comprises providing a command line interface (CLI) for analyzing the cause of failure of the network device.

11. The method of claim 1, wherein the non-volatile memory is embedded on a component of the network device, the component being selected from a group consisting of router processors, line cards, fabric cards, fan modules and power supplies.

12. A system for managing data pertaining to a failure of a network device, the system comprising:
    means for collecting the data for storage in a non-volatile memory of the network device, the data being collected in a boot log record, a runtime log record, a failure event data portion, and an environmental data portion;
    means for storing the boot log record, wherein the boot log record pertains to a boot history of the network device;
    means for storing the failure event data and the environmental data portions, wherein the failure event data portion indicates a hardware failure of the network device, and wherein the environmental data portion includes environmental information pertaining to the network device;
    means for storing the runtime log record when the network device is restarted, wherein the runtime log record pertains to an operational history of the network device; and
    means for providing access to the data stored in the non-volatile memory.

13. The system of claim 12, further comprising means for consolidating the data in the non-volatile memory based on free space available in the non-volatile memory.

14. The system of claim 12, wherein the means for providing the access comprises providing a command line interface (CLI).

15. The system of claim 12, further comprising means for storing data pertaining to a crash of the network device when the network device is restarted due to the crash.

16. A system for managing data pertaining to a failure of a network device, the system comprising:
    a non-volatile memory of the network device for storing the data;
    a programmatic interface for accessing the data; and
    a data manager for facilitating storing of the data in the non-volatile memory, wherein the data manager is operable to:

collect the data for storage in a non-volatile memory of the network device, the data being collected in a boot log record, a runtime log record, a failure event data portion, and an environmental data portion;

store the boot log record, wherein the boot log record pertains to a boot history of the network device;

store the failure event data and the environmental data portions, wherein the failure event data portion indicates a hardware failure of the network device, and wherein the environmental data portion includes environmental information pertaining to the network device; and store the runtime log record when the network device is restarted, wherein the runtime log record pertains to an operational history of the network device.

17. The system of claim 16, wherein the data manager is further operable to consolidate the data in the non-volatile memory based on free space available in the non-volatile memory.

18. The system of claim 17, wherein the data consolidation comprises a replacement of the data stored in the non-volatile memory with new data having a time of failure later than the time of failure of the data stored in the non-volatile memory.

19. The system of claim 16, wherein the programmatic interface comprises a command line interface (CLI).

20. The system of claim 16, wherein the data manager is further operable to store data pertaining to a crash of the network device when the network device is restarted due to the crash.

* * * * *